UNITED STATES PATENT OFFICE.

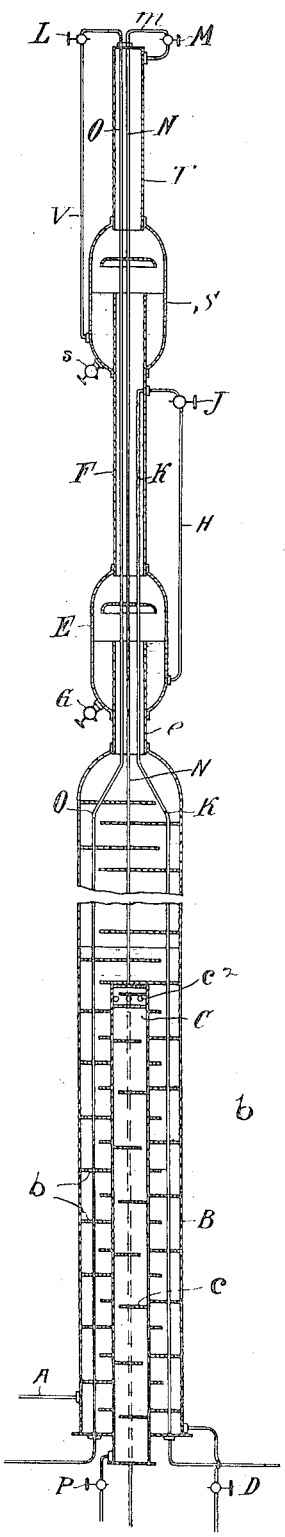

HERMANN BLAU, OF AUGSBURG, GERMANY.

PROCESS OF SEPARATING WATER FROM GAS.

1,160,826.  Specification of Letters Patent.  Patented Nov. 16, 1915.

Application filed February 1, 1913. Serial No. 745,732.

*To all whom it may concern:*

Be it known that I, HERMANN BLAU, a subject of the German Emperor, residing at Augsburg, in the German Empire, have invented certain new and useful Improvements in and Relating to Processes of Separating Water from Gas, of which the following is a specification.

My invention relates to process for separating water from gas when making liquefied illuminating gas, and it consists in the various steps herein described and particularly pointed out in the appended claims.

An object of my invention is to provide a continuous process by means of which water may be separated from the gas while the latter is being liquefied, so as to prevent the formation of ice in the liquefied gas.

A further object of my invention is to provide a process for separating water from the gas which can be carried out with the greatest economy due to the fact that the currents of uncondensed gas, liquefied gas, and water mutually operate upon one another in such a manner that the highest efficiency for artificial cooling is insured.

Other objects and advantages will appear in the following specification and the novel features of the invention will be particularly pointed out in the appended claims.

My invention is illustrated in the accompanying drawing which is a central vertical section through one form of apparatus which may be used to advantage in carrying out the process.

It will be understood that the illustration is for purposes of explaining the process and that other forms of apparatus might be used without departing from the spirit of the invention.

Referring then to the drawings I have shown a cooling column B which contains baffle plates $b$, these baffle plates extending from opposite walls alternately so as to provide a circuitous path for the gases passing therethrough.

Disposed centrally of the column B is a cylinder C which is provided with baffle plates $c$ arranged alternately as are those in column B. At the top of the cylinder C are openings $c^2$ by means of which communication is established with the interior of the column B.

Supported on the top of the column B is a pipe $e$ which extends into the interior of a receptacle E. A drain cock G is provided at the bottom of the receptacle E. A pipe F leads from the top of the receptacle E and extends part way into a receptacle S which is similar to the receptacle E, and which is provided with a drain cock $s$ similar to the drain cock G.

A tube T extends upwardly from the receptacle S. An outer pipe H communicates at one end with the interior of the receptacle E, passes upwardly, thence into the tube F, where it connects with an inner pipe K which extends downwardly through the tube $e$ and through one side of the column B, thence through the bottom of the column. A valve J is provided for the outer pipe H. An outer pipe V communicates with the interior of the receptacle S, passes upwardly and connects with an inside pipe O which passes downwardly through the receptacle S, tube F, receptacle E, tube $e$, and column B. At the top of the pipe T is an outlet pipe $m$ on the outside of the apparatus which is provided with a valve M. This connects with an inner pipe N which passes centrally through the apparatus and out at the lower end. A valve L is provided for the pipe V.

From the foregoing description of the various parts of the apparatus the process may be readily understood.

The raw gases are first compressed and cooled by apparatus (not shown) and the cool compressed gas enters through a pipe A into the bottom of the column B. The gas passes upwardly in the column B being deflected by the baffle plates, as stated, and some of the gas is liquefied. As the gas rises it is continuously cooled in the column B. As the temperature of the gas decreases the water vapor is condensed out of the gas and being heavier will flow downwardly to the bottom of the column B. The uncondensed gas which rises above the fluid in the column enters through the pipe $e$ into the receptacle E and comes into intimate contact with the pipes K, O and N where it is still further cooled and more of the water vapor is condensed out of the gas. The water flows down the walls of the receptacle E and collects in the bottom thereof and may be drawn off through the drain cock G. The gas which is not condensed at this portion of the apparatus passes on up through the pipe F and through the receptacle S where part of it is cooled in the pipe 2. The water vapor passes into the receptacle S and being drawn therefrom through the drain cock s.

Part of the liquefied gas in the receptacle E is conveyed by means of the pipe H into the pipe K, the valve J being open. The passage of this liquefied gas into the pipe K causes the latter to become very cold thus tending to condense the water vapor which comes into contact with it. The same thing occurs in the upper receptacle S, that is to say, part of the liquefied gas is passed through the pipe V and thence downwardly through the pipe O. Thus the pipe O forms a cooling pipe for the gas which passes upwardly.

The uncondensed gas at the top of the column B is conducted through the pipe $m$, the valve M being opened into the pipe N and thence downwardly. As will be readily seen most of the liquefication of the gas will take place in the column B and this liquefied gas being lighter than the water will rise to the top of the column where it is drawn off through the openings $c^2$ in the central pipe C.

The liquefied gas is supersaturated and the surplus of the dissolved gases must therefore be expelled by heating the liquefied gas to a normal temperature. This is done by compelling the liquefied gas to pass down through the center of the tube $b$ so that the supersaturated liquefied gas actually extracts heat from the gases coming in through the pipe A and which pass upwardly through the column B. This action serves a twofold purpose, the heating of the supersaturated liquefied gas to normal temperature and the cooling of the gases passing upwardly from the pipe A.

The liquefied gas which passes into the interior of the column C may be drawn off at the bottom of the column, by opening the valve P, into bottles or other containers ready to receive it. The uncondensed gas which is driven off by the heating of the liquefied gas to the normal temperature, passes upwardly again into the top of the column B and mingles with that which comes up from the pipe A.

The cooling effected in the pipes K and O is due to the evaporation of liquid admitted through valves J and L and in pipe N, due to the expansion of high pressure gases through the valve M. Therefore in the pipes K, O, N there exists a comparatively low pressure for enabling the expansion of the admitted liquid and the high pressure gases whereby the cooling is effected.

It will thus be seen that the process is continuous. Furthermore, the cooling of the incoming gas by the gas which has already been liquefied tends to provide an arrangement by means of which the highest efficiency for artificial cooling is insured.

I claim:

1. The herein described steps in a process of separating water vapor from gas which consists in cooling, in successive stages, to progressively lower temperatures, a mixture of water vapor and gas under pressure, said mixture being constantly made to pass upwardly and removing the gases and water vapor thus liquefied and passed downwardly from the unliquefied portion, the cooling of the gaseous mixture being effected by permitting the uncondensed gases to expand to a lower pressure and also by the evaporation of part of the liquefied gases under low pressure.

2. The herein described steps in a process of separating water vapor from gas, which consists in cooling, in successive stages, to progressively lower temperature, a mixture of water, vapor and gas under pressure and removing the gases and water vapor thus liquefied from the unliquefied portion, the cooling of the gaseous mixture being effected by permitting the uncondensed gases to expand to a lower pressure and also by the evaporation of part of the liquefied gases under low pressure.

In testimony whereof I affix my signature in presence of two witnesses.

HERMANN BLAU.

Witnesses:
  A. V. W. COTTER,
  JOHANNA STERN.